United States Patent [19]
Pisacane et al.

[11] Patent Number: 6,004,363
[45] Date of Patent: Dec. 21, 1999

[54] ABRASIVE ARTICLE AND METHOD FOR MAKING THE SAME

[75] Inventors: Ferdinand Frederick Pisacane, Laguna Beach, Calif.; Eric Luo, Plano, Tex.

[73] Assignee: Wilshire Technologies, Inc., Carlsbad, Calif.

[21] Appl. No.: 09/030,169

[22] Filed: Feb. 25, 1998

[51] Int. Cl.⁶ .............................. B24D 3/00; B24D 3/28; B24D 17/00
[52] U.S. Cl. .................. 51/297; 51/295; 51/298; 51/293
[58] Field of Search .............................. 51/295, 297, 298, 51/293

[56] References Cited

U.S. PATENT DOCUMENTS

| | | | |
|---|---|---|---|
| 3,414,928 | 12/1968 | Lemelson | 15/118 |
| 3,570,036 | 3/1971 | Gilchrist et al. | 15/104.94 |
| 3,810,841 | 5/1974 | Richter | 252/91 |
| 4,139,686 | 2/1979 | Jabs et al. | 521/121 |
| 4,421,526 | 12/1983 | Strickman et al. | 51/296 |
| 4,566,911 | 1/1986 | Tomita et al. | 134/6 |
| 4,576,612 | 3/1986 | Shukla et al. | 51/295 |
| 5,316,812 | 5/1994 | Stout et al. | 51/295 |
| 5,460,655 | 10/1995 | Pisacane et al. | 134/6 |
| 5,595,578 | 1/1997 | Stubbs et al. | 51/295 |

*Primary Examiner*—Michael Marcheschi
*Attorney, Agent, or Firm*—Rockey, Milnamow & Katz, Ltd.

[57] ABSTRACT

The present invention relates to an abrasive article. The abrasive article of the present invention contains an abrasive layer, a polyurethane structure bonded to the abrasive layer and a substrate bonded to the polyurethane structure. The present invention also involves a method for making said abrasive article.

17 Claims, No Drawings

ND6,004,363

ABRASIVE ARTICLE AND METHOD FOR MAKING THE SAME

TECHNICAL FIELD OF THE INVENTION

The present invention relates to an abrasive article that can be employed in cleaning a metal, glass, or plastic surface in a clean room, and a method for making said abrasive article.

BACKGROUND OF THE INVENTION

Various abrasive parts for use in cleaning have been developed incorporating a scrubbing surface within a polyurethane or other polymeric sponge. U.S. Pat. No. 3,414,928 describes a sponge containing plastic or wire wool embedded into the surface of a polyurethane or polyacetate sponge. U.S. Pat. No. 3,570,036 describes a multiple layer polyurethane sponge, wherein the surface layers containing alternating polyurethane laminar strips of differing textures. U.S. Pat. No. 3,810,841 describes that abrasives as well as other additives, such as soaps and detergents, may be incorporated integrally into a polyurethane sponge having at least one reticulated layer for egress of additives.

In clean rooms where semiconductors, magnetic storage media, or thin film circuits or semiconductors are produced, cleaning problems are often encountered. Frequently, it is necessary to clean a metal, glass, or plastic surface so as to remove metal and other particulates, and so as to remove organic and other residues. For example, after a metal pipe has been installed in a clean room, it is necessary to clean the interior surface of the metal pipe so as to remove metal particles resulting from prior manufacturing, cutting, or facing operations.

Ideally, articles for cleaning metal, glass, or plastic surfaces in clean rooms should satisfy certain criteria. Such articles should be hydrophilic and static-dissipative. Particularly but not exclusively if used in clean rooms where semiconductors, magnetic storage media, or thin film circuits are produced, such articles should have very low counts of potentially destructive particles when released in deionized water, particularly particles of a size greater than about 0.5 $\mu$m, and very low counts of potentially deleterious ions when released in deionized water, particularly chloride, fluoride, sodium, sulfate, sulfite or silicon ions. Heretofore, none of the cleaning pads available for cleaning metal, glass, or plastic surfaces in clean rooms have satisfied all of these criteria.

SUMMARY OF THE INVENTION

The present invention relates to an abrasive article that contains an abrasive layer, a polyurethane film structure bonded to the abrasive layer and a substrate bonded to the polyurethane film structure. When the abrasive article is immersed in deionized water it releases fewer than about $36.0 \times 10^6$ particles of a size greater than about 0.5 $\mu$m per square meter of the structure and fewer than about 2.5 parts per million of chloride, fluoride, sodium, sulfate, sulfite or silicon ions.

The substrate used in the abrasive article is an open cell, static dissipative, hydrophilic, polyurethane foam. Preferably, the polyurethane film structure contains two polyurethane film layers, which are bonded to each other, and one of the polyurethane film is bonded to the abrasive layer. Most preferably, one of the polyurethane film layers is a high-melting polyurethane and the other polyurethane film layer is a low-melting polyurethane. The low-melting polyurethane film layer is bonded to the abrasive layer and the high-melting polyurethane layer is bonded to the low-melting polyurethane film layer and the substrate is bonded to the high-melting polyurethane layer.

The present invention also relates to a method of producing an abrasive article. The method involves bonding a polyurethane film structure to an abrasive layer and bonding a substrate to the polyurethane layer. When the polyurethane film structure contains two polyurethane film layers, the method involves bonding the first polyurethane film layer on to the surface of an abrasive layer, bonding a second polyurethane film layer on to the first polyurethane film layer, and bonding a substrate on to the second polyurethane film layer. Preferably, the first polyurethane film layer is a low-melting polyurethane and the second polyurethane film layer is a high-melting polyurethane.

DETAILED DESCRIPTION OF THE INVENTION

The present invention relates to an abrasive article, specifically an abrasive pad. The present invention also relates to a method for making the abrasive article. The abrasive article of the present invention has an abrasive layer, a polyurethane film structure bonded to the abrasive layer and a substrate bonded to the polyurethane film structure.

The abrasive layer used in the present invention contains abrasive particles. Individual abrasive particles may be selected from those commonly used in the abrasive art, however, the abrasive particles (size and composition) will be chosen based upon the appropriate abrasive particles for use in the present invention include hardness, compatibility with the intended work piece and particle size.

The abrasive particles may be composed of natural abrasives or manufactured abrasives. Examples of natural abrasives include: diamond, corundum, emery, garnet, bubrstone, quartz, sandstone, flint, quartzite, silica, feldspar, pumice and talc. Examples of manufactured abrasives include: boron carbide, cubic boron nitride, fused alumina, ceramic aluminum oxide, heat treated aluminum oxide, alumina zirconia, glass, silicon carbide, iron oxides, tantalum carbide, cerium oxide, tin oxide, titanium carbide, synthetic diamond, manganese dioxide, zirconium oxide and silicon nitride.

Abrasive particles used in this invention have a particles size in the range of from about 60 grit to about 1200 grit.

As used herein, the term "abrasive particle" includes agglomerates of individual abrasive particles. An abrasive agglomerate is formed when a plurality of abrasive particles are bonded together with a binder to form a larger abrasive particle which may gave a specific particulate structure. The particles which form the abrasive agglomerate may contain more than one type of abrasive particle.

The abrasive article of the present invention also contains a polyurethane film structure. The polyurethane film structure used in the present invention contains at least two polyurethane film layers. The two polyurethane film layers are bonded to each other and one of the layers is bonded to the abrasive layer. Any polyurethane polymer can be used for the film layers and the polyurethane polymer used for each of the layers may be the same of different. Preferably, one of the film layers is a low-melting polyurethane layer. As used herein, the term"low-melting polyurethane layer" means melting at lower temperature and the term "high-melting polyurethane layer" means melting a t higher temperature. An example of a low-melting polyurethane that can be used in the present invention is PURO HI, which is available from Adhesive Films, Inc., 4 Barnett Road, Pine Brook, N.J. 07058. An example of a high-melting polyurethane that can be used in the present invention is PT6100S, which is available from Deerfield Urethane Inc., Route 5 & 10, Box 186, South Deerfield, Mass. 01273. The low-melting temperature polyurethane is bonded to the abrasive layer and the high-melting temperature polyurethane is bonded to the low-melting temperature polyurethane.

The substrate used in the present invention is an open cell, static dissipative, hydrophilic, polyurethane foam and is bonded to the polyurethane film structure. The polyurethane foam used in the present invention is a naturally static-dissipative material, that is, it is electrostatic charge (ESD) safe. The polyurethane foam material has a surface resistivity in $10^7$ to about $10^8$ ohms/cm$^2$. Generally, materials which have surface resistivities which are less than about $10^{12}$ ohms/cm$^2$ are considered ESD safe. Materials which have surface resistivities which are greater than about $10^{12}$ ohms/cm$^2$ require treatment, such as by processing with surfactants, to lower the surface resistivity to acceptable levels.

An example of an open cell, static dissipative hydrophilic polyurethane foam that can be used in this invention is Ultra SOLV, which is commercially available from Wilshire Technologies, Inc.

The abrasive article of the present invention is prepared by bonding a polyurethane film structure to an abrasive layer and then bonding a substrate to the polyurethane film structure. When the polyurethane film structure contains a low-melting polyurethane layer and a high-melting polyurethane layer, the abrasive article is prepared by bonding a low-melting polyurethane layer to an abrasive layer, bonding a high-melting polyurethane film to the low-melting polyurethane film and then bonding a substrate to the high-melting polyurethane film.

The abrasive article of the present invention is preferably a pad, having a size of from about 1"×2" to about 10"×10". The pad is generally parallel sided, having a slab-like shape defining two broad surfaces, two long sides, and two short ends. The abrasive article could be triangular pad, rod shape or other shapes depending on applications.

The entire abrasive article or components of the abrasive article, such as the substrate may be laundered, as described in U.S. Pat. No. 5,460,655, the disclosure of which is herein incorporated by reference, so as to minimize the release of potentially destructive particles, particularly particles of a size greater than about 0.5 μm, and so as to minimize potential release of potentially deleterious ions, particularly chloride, fluoride, sodium, sulfate, sulfite or silicon ions.

Specifically, the article is laundered so that when the article is immersed in deionized water it releases fewer than about $36.0 \times 10^6$ particles of a size greater than about 0.5 μm per square meter of apparent surface area of the article and fewer than about 2.5 parts per million of chloride, fluoride, sodium, sulfate, sulfite, or silicon ions. The laundering process not only reduces the number of particles released from the article and reduces the residual chemical contaminants but also reduces the amount of total nonvolatile residue (TNVR) which would be released from the article during use.

Generally, the laundering process uses a detergent suspended in various molar ratios, such as sodium oxalate, sodium oleate, sodium perchlorate, and sodium peroxydisulfate. The detergent solution contains no more than 0.002% of ions including chloride, bromide, sodium, and the like. Optionally, the detergent may include oxidants, buffers, and mild acid to optimize the material for specific applications. The preferred temperature range for the laundering process is between about 104° F. (40° C.) and about 149° F. (65° C.).

The entire article may be laundered after final assembly of the components or each of the components of the article, particularly the abrasive layer and substrate, may be laundered individually prior to assembly of the article.

By way of example, and not of limitation, examples of the present invention will now be given.

EXAMPLE 1

Construction of an Abrasive Pad

Micro-Mesh, an abrasive sheet sold by Micro-Surface Finishing Products, Inc., 1217 West Street, Wilton, Iowa, was placed on a clean surface with the abrasive side facing down. The abrasive sheet contained silicon carbide abrasive particles having a particle size of 180 grit. PURO HI, a low-melting polyurethane film, sold by Adhesive Films, Inc. 4 Barnett Road, Pine Brook, N.J. 07058, was deposited on the top of the fabric side of the abrasive sheet. Next, PT6100S, a high-melting polyurethane film, sold by Deerfield Urethane, Inc., Route 5 & 10, Box 186, South Deerfield, Mass., was placed on the top of the low-melting polyurethane film. Four films of 3.5 inches by 4.5 inches were then cut. The four films were then placed on a hot plate at the controlled temperature of 360° F. with the abrasive side facing the hot plate. A 10 pound weight measuring 4 inches by 5 inches was then placed on the top of the hot plate. After 45 seconds, the laminate was removed from the hot plate and was cut into a piece having the dimension of 3 inches by 4 inches. Laser Ablation ICP-MS Analysis was conducted on the pad by elemental Research Inc., 309-267 West Esplanade, North Vancouver, British Columbia, Canada. Laser Ablation ICP-MS Analysis is where a layer of material is removed by laser and vaporized. The material goes into a vacuum chamber and is analyzed by Mass Spectroscopy. The results of the analysis are shown in Table 1, below.

TABLE 1

| | |
|---|---|
| Lithium | <0.01 |
| Berylium | 0.17 |
| Boron | 0.2 |
| Sodium | 11.0 |
| Magnesium | 40.0 |
| Aluminum | 170 |
| Sulphur | 12.0 |
| Calcium | not det. |
| Scandium | <0.1 |
| Titanium | 52.0 |
| Vanadium | 15.0 |
| Chromium | 19.0 |
| Manganese | 6.5 |
| Iron | 180.0 |
| Cobalt | 0.18 |
| Nickel | 9.10 |
| Copper | 11.0 |
| Zinc | <0.01 |
| Gallium | <0.01 |
| Germanium | 0.60 |
| Arsenic | 0.65 |
| Selenium | <1 |
| Bromine | 0.08 |
| Rubidium | 0.06 |
| Strontium | 1.70 |
| Yttrium | 0.32 |
| Zirconium | 2.70 |
| Niobium | <0.01 |
| Molybdenum | 0.51 |

TABLE 1-continued

| | |
|---|---|
| Ruthenium | <0.01 |
| Rhodium | <0.01 |
| Palladium | <0.01 |
| Silver | <0.01 |
| Cadmium | 0.07 |
| Indium | <0.01 |
| Tin | 0.22 |
| Antimony | 0.05 |
| Tellurium | 0.37 |
| Iodine | 0.03 |
| Caesium | <0.01 |
| Barium | 6.20 |
| Lanthanum | 0.33 |
| Cerium | 0.45 |
| Praseodymium | 0.16 |
| Neodymium | <0.01 |
| Europium | <0.01 |
| Samarium | 0.05 |
| Gadolinium | 0.11 |
| Terbium | 0.04 |
| Dysprosium | 0.03 |
| Holmium | 0.03 |
| Erbium | 0.06 |
| Thulium | 0.04 |
| Ytterbium | 0.10 |
| Luttetium | 0.02 |
| Hafnium | 0.03 |
| Tantalum | 0.02 |
| Tungsten | <0.01 |
| Rhenium | <0.01 |
| Osmium | <0.01 |
| Iridium | <0.01 |
| Platinum | 0.04 |
| Gold | <0.01 |
| Mercury | 0.01 |
| Thallium | <0.01 |
| Lead | 3.80 |
| Bismuth | 0.07 |
| Thorium | <0.01 |
| Uranium | <0.01 |

EXAMPLE 2

Comparison with SCOTCHBRITE® abrasive scouring pad

Several SCOTCHBRITE® abrasive scouring pads were subjected to laser Ablation ICP-MS Analysis. The results are shown below in Table 2.

TABLE 2

| | G1-PAD-7447a | G1-PAD-7447b | G1-PAD-7447c |
|---|---|---|---|
| Lithium | 32.0 | 77.0 | 59.0 |
| Beryllium | 2.40 | 3.20 | 2.30 |
| Boron | 12.0 | 20.0 | 14.0 |
| Sodium | 520 | 390 | 430 |
| Magnesium | 2200 | 3200 | 2700 |
| Aluminum | maj. cmp | maj. cmp | maj. cmp |
| Silicon | 3300 | 5300 | 4300 |
| Sulphur | 32.0 | 35.0 | 30.0 |
| Calcium | 56000 | 65000 | 62000 |
| Scandium | 2.4 | 4.6 | 2.0 |
| Titanium | 5900 | 9200 | 9000 |
| Vanadium | 16.0 | 42.0 | 46.0 |
| Chromium | 530 | 310 | 320 |
| Manganese | 590 | 830 | 710 |
| Iron | 6300 | 8500 | 8500 |
| Cobalt | 0.71 | 1.50 | 1.40 |
| Nickel | 9.90 | 13.0 | 17.0 |
| Copper | 29.0 | 23.0 | 31.0 |
| Zinc | 15.0 | 19.0 | 16.0 |
| Gallium | 27.0 | 51.0 | 37.0 |
| Germanium | 10.0 | 16.0 | 15.0 |

TABLE 2-continued

| | G1-PAD-7447a | G1-PAD-7447b | G1-PAD-7447c |
|---|---|---|---|
| Arsenic | 3.10 | 4.80 | 20.0 |
| Selenium | <0.01 | <0.01 | <0.01 |
| Bromine | 0.10 | 0.10 | 0.07 |
| Rubidium | 6.20 | 7.50 | 5.10 |
| Strontium | 170 | 150 | 130 |
| Yttrium | 79.0 | 99.0 | 61.0 |
| Zirconium | 390 | 990 | 480 |
| Niobium | 1.50 | 13.0 | 4.90 |
| Molybdenum | 9.60 | 6.50 | 6.30 |
| Ruthenium | 0.02 | 0.02 | <0.01 |
| Rhodium | 0.08 | 0.05 | <0.01 |
| Palladium | 2.10 | 2.70 | 1.70 |
| Silver | 0.46 | 1.50 | 0.52 |
| Cadmium | 0.21 | 0.17 | 0.35 |
| Indium | 0.23 | 0.18 | 0.41 |
| Tin | 18.0 | 6.90 | 6.40 |
| Antimony | 3.30 | 3.20 | 2.80 |
| Tellurium | <0.01 | 0.19 | 0.37 |
| Iodine | <0.01 | <0.01 | <0.01 |
| Caesium | 0.07 | 0.16 | 0.18 |
| Barium | 63.0 | 89.0 | 65.0 |
| Lanthanum | 63.0 | 62.0 | 47.0 |
| Cerium | 210 | 260 | 150 |
| Praseodymium | 14.0 | 28.0 | 14.0 |
| Neodymium | 54.0 | 81.0 | 46.0 |
| Europium | 3.30 | 4.0 | 4.0 |
| Samarium | 14.0 | 17.0 | 12.0 |
| Gadolinium | 34.0 | 43.0 | 26.0 |
| Terbium | 2.40 | 3.40 | 2.10 |
| Dysprosium | 19.0 | 29.0 | 13.0 |
| Holmium | 3.70 | 5.50 | 3.0 |
| Erbium | 11.0 | 17.0 | 7.60 |
| Thulium | 1.90 | 3.40 | 1.40 |
| Ytterbium | 16.0 | 26.0 | 16.0 |
| Lutetium | 1.60 | 3.0 | 1.20 |
| Hafnium | 12.0 | 39.0 | 15.0 |
| Tantalum | 0.09 | 0.86 | 0.33 |
| Tungsten | 0.41 | 1.80 | 0.71 |
| Rhenium | 0.04 | 0.09 | 0.16 |
| Osmium | <0.01 | 0.17 | <0.01 |
| Iridium | <0.01 | <0.01 | 0.03 |
| Platinum | <0.01 | <0.01 | 0.11 |
| Gold | <0.01 | <0.01 | 0.05 |
| Mercury | 0.10 | 0.08 | 0.22 |
| Thallium | <0.01 | <0.01 | 0.06 |
| Lead | 12.0 | 23.0 | 15.0 |
| Bismuth | 0.49 | 0.71 | 4.0 |
| Thorium | 50.0 | 82.0 | 50.0 |
| Uranium | 12.0 | 41.0 | 12.0 |

Results: As shown by the results in Tables 1–2, the abrasive article of the present invention contains less metal ions than the SCOTCHBRITE® abrasive scouring pads that were tested.

What is claimed is:

1. An abrasive article, suitable for use in a clean room comprising:

an abrasive layer;

a polyurethane film structure bonded to the abrasive layer; and a substrate bonded to the polyurethane film structure; and
   wherein the article is laundered so that when immersed in deionized water the article releases fewer than about $36.0 \times 10^6$ particles of a size greater than about 0.5 $\mu$m per square meter of the article and fewer than about 2.5 parts per million of chloride, fluoride, sodium, sulfate, sulfite, or silicon ions.

2. The article of claim 1 wherein the substrate is an open cell, static dissipative, hydrophilic, polyurethane foam.

3. The article of claim 1 wherein the polyurethane film structure comprises at least two polyurethane film layers, which are bonded to each other, and one of which is bonded to the abrasive layer.

4. The article of claim 3 wherein the polyurethane film structure comprises a first polyurethane film layer and a second polyurethane film layer which melts at a higher temperature than the first polyurethane film layer.

5. The article of claim 4 wherein the first polyurethane film layer is bonded to the abrasive layer, the second polyurethane film layer is bonded to the first polyurethane film layer and the substrate is bonded to the second polyurethane film layer.

6. The article of claim 1 wherein the abrasive layer contains abrasive particles having a size from about 60 grit to about 1200 grit.

7. An abrasive article, suitable for use in a clean room, comprising:

an abrasive layer;

a first polyurethane film layer bonded to the abrasive layer;

a second polyurethane film layer, which melts at a higher temperature than the first polyurethane film layer, bonded to the first polyurethane film layer; and a substrate bonded to the second polyurethane film layer, wherein the article when immersed in deionized water releases fewer than about $36.0 \times 10^6$ particles of a size greater than about 0.5 µm per square meter of the article and fewer than about 2.5 parts per million of chloride, fluoride, sodium, sulfate, sulfite, or silicon ions.

8. The article of claim 7, wherein the substrate is an open cell, static dissipative, hydrophilic, polyurethane foam.

9. The article of claim 7, wherein the abrasive layer contains abrasive particles having a size from about 60 grit to about 1200 grit.

10. A method of producing an abrasive article suitable for use in a clean room, the method comprising the steps of:

a) bonding a polyurethane film structure to an abrasive layer;

b) bonding a substrate to the polyurethane film structure; and c) laundering the article, wherein the article releases fewer than about $36.0 \times 10^6$ particles of a size greater than about 0.5 µm per square meter of the article and fewer than about 2.5 parts per million of chloride, fluoride, sodium, sulfate, sulfite or silicon ions.

11. The method of claim 10, wherein the substrate is an open cell, static dissipative, hydrophilic, polyurethane foam.

12. The method of claim 10 further comprising the steps of bonding a first polyurethane film layer on the surface of the abrasive layer, bonding a second polyurethane film layer on the first polyurethane film layer, wherein the first and second polyurethane film layers define the polyurethane film structure.

13. The method of claim 12, wherein the second polyurethane film layer melts at a higher temperature than the first polyurethane film layer.

14. A method of producing an abrasive article suitable for use in a clean room, the method comprising the steps of:

a) bonding a first polyurethane film layer to an abrasive layer;

b) bonding a second polyurethane film layer to the first polyurethane film layer; and c) bonding a substrate to the second polyurethane film layer, wherein the article releases fewer than about $36.0 \times 10^6$ particles of a size greater than about 0.5 µm per square meter of the article and fewer than about 2.5 parts per million of chloride, fluoride, sodium, sulfate, sulfite or silicon ions.

15. The method of claim 14, wherein the substrate is an open cell, static dissipative, hydrophilic, polyurethane foam.

16. An abrasive article, suitable for use in a clean room, comprising:

a laundered abrasive layer;

a polyurethane film structure bonded to the abrasive layer; and a laundered substrate bonded to the polyurethane film structure, wherein the article, when immersed in deionized water, releases fewer than about $36.0 \times 10^6$ particles of a size greater than about 0.5 µm per square meter of the article and fewer than about 2.5 parts per million of chloride, fluoride, sodium, sulfate, sulfite or silicon ions.

17. The article of claim 16, wherein the polyurethane film structure is a laundered polyurethane film structure.

* * * * *

UNITED STATES PATENT AND TRADEMARK OFFICE
CERTIFICATE OF CORRECTION

PATENT NO : 6,004,363
DATED : December 21, 1999
INVENTOR(S) : Ferdinand Frederick Pisacane; Eric Luo It is certified that error appears in the above-identified patent and that said Letters Patent are hereby corrected as shown below:

Column 2, lines 10 and 11, "on to" should read -- onto --;

Column 2, line 32 after "invention", the word -- and -- should be inserted;

Column 2, line 51, "gave" should read -- give --;

Column 2, line 61 after "same", the word -- of -- should be inserted.

Signed and Sealed this

Eighth Day of May, 2001

Attest:

NICHOLAS P. GODICI

*Attesting Officer*   *Acting Director of the United States Patent and Trademark Office*